Aug. 14, 1951 R. D. MacDONALD 2,564,486
LOADING MACHINE
Filed March 12, 1948 5 Sheets-Sheet 1
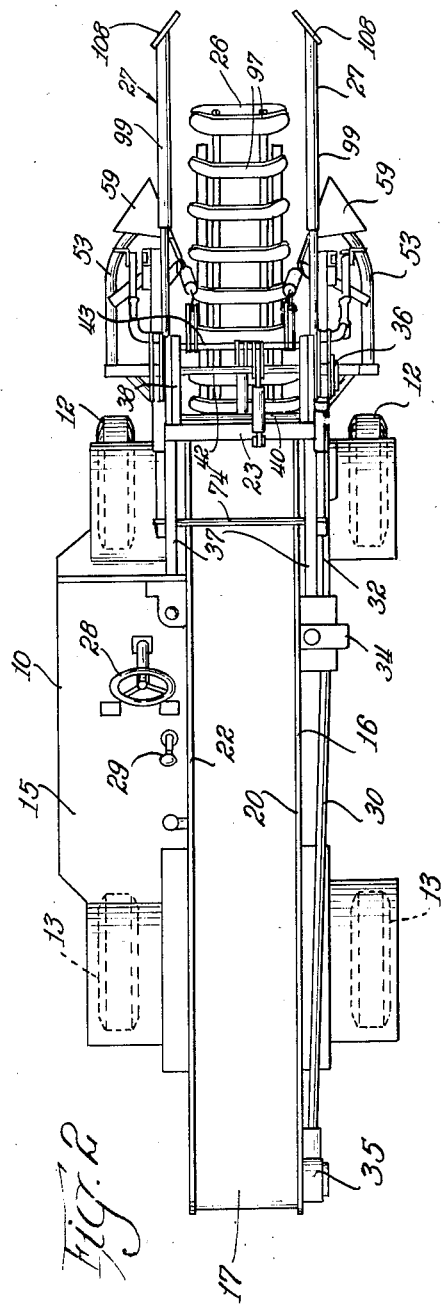
INVENTOR.
Raymore D. MacDonald
BY
Albert G. McCaleb
Atty.

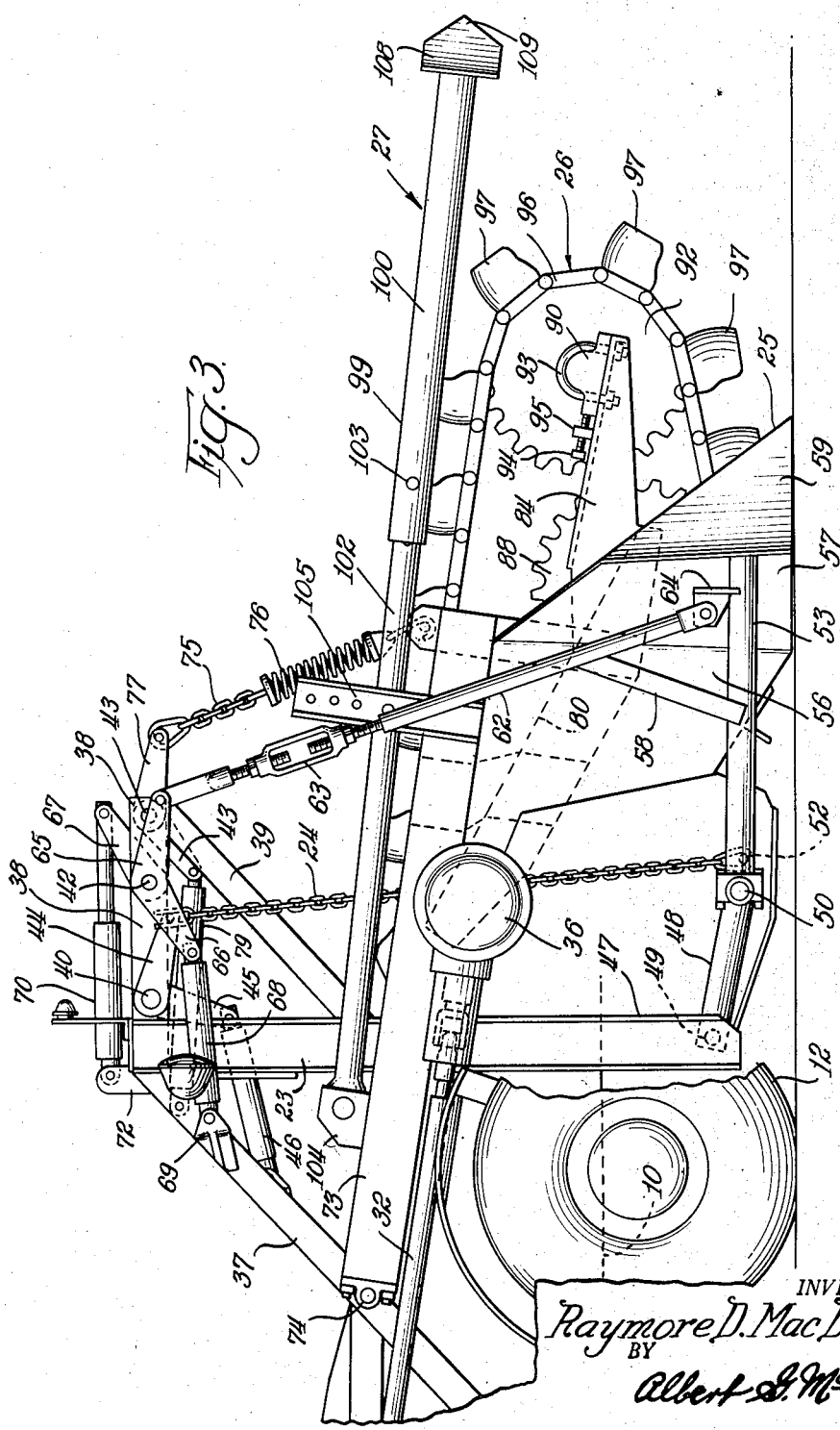

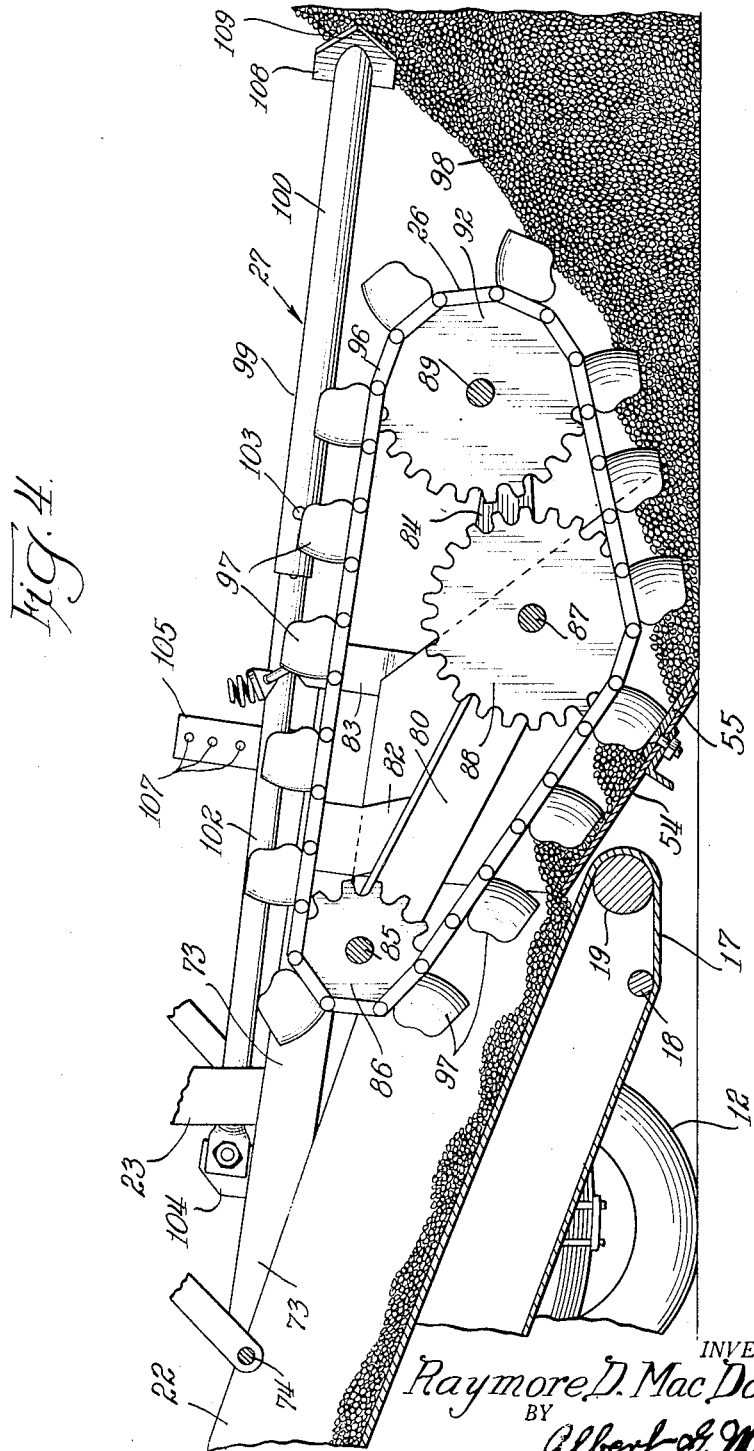

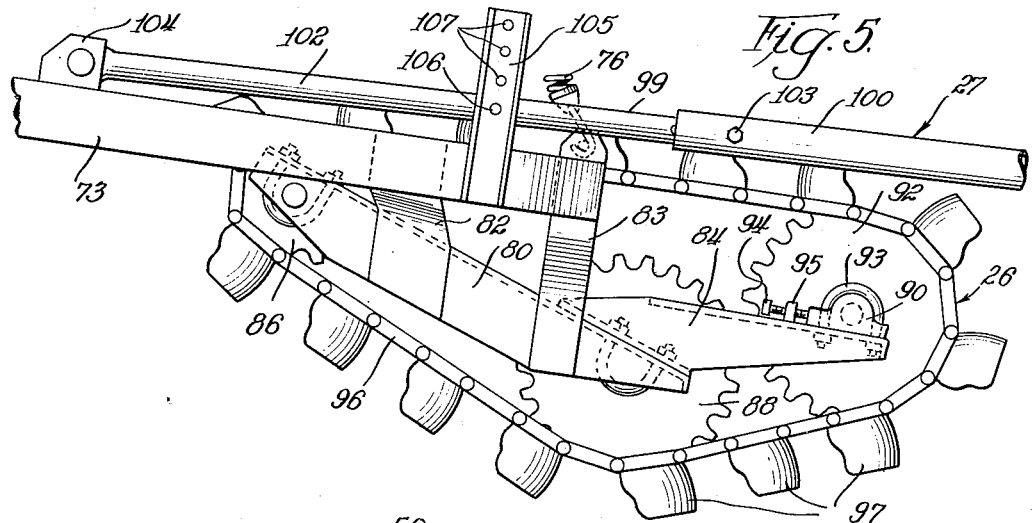
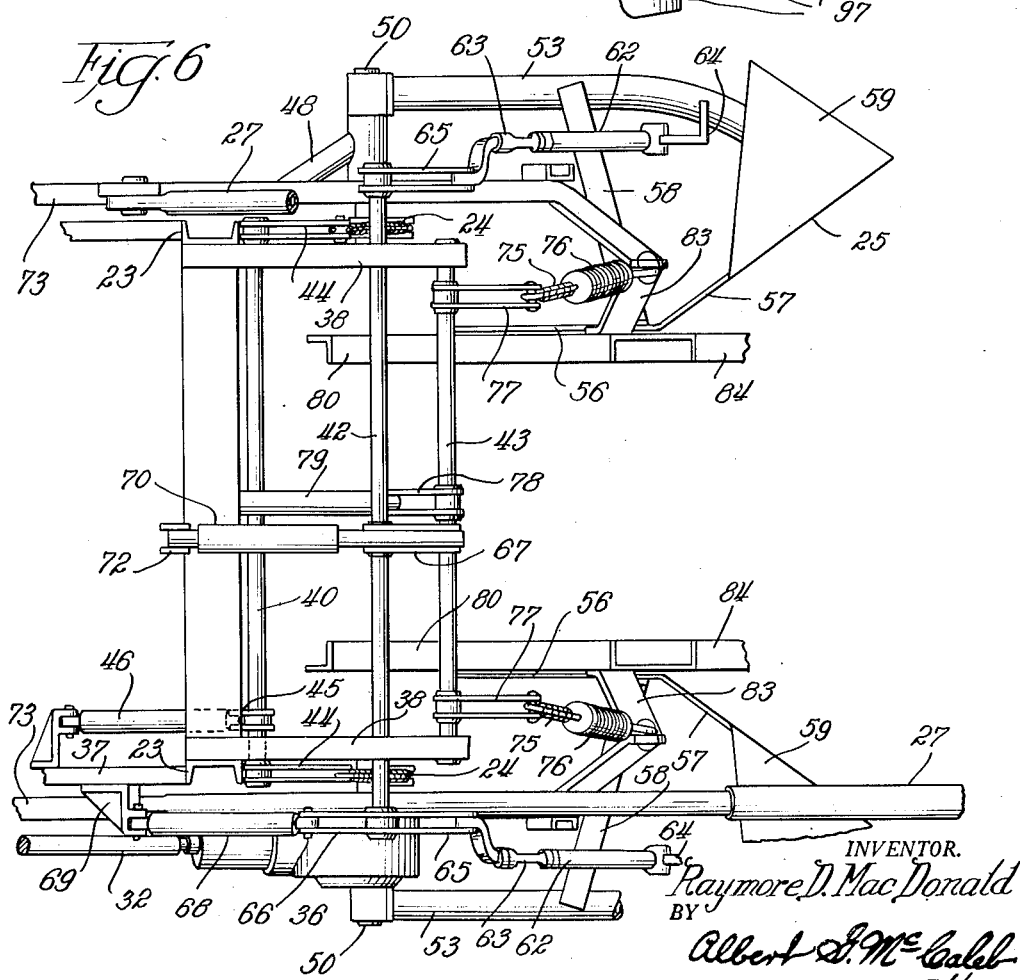

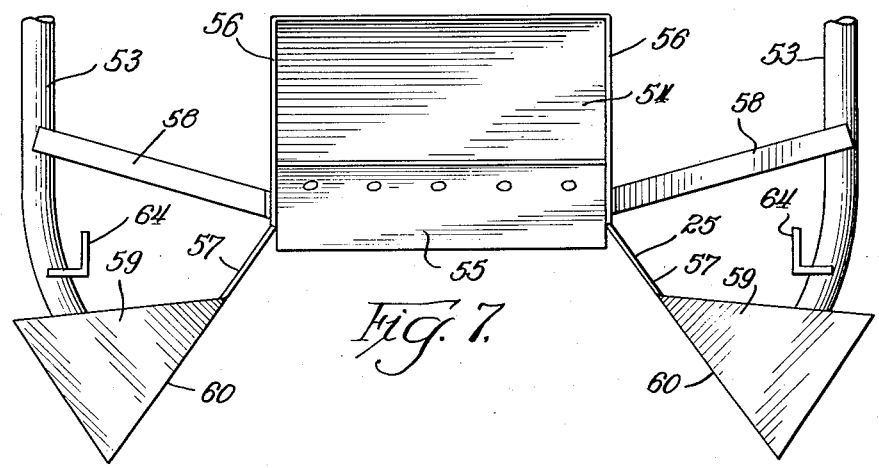
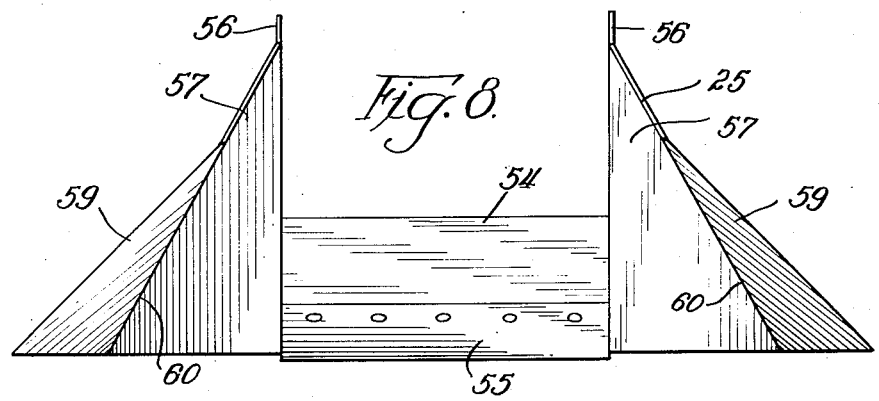
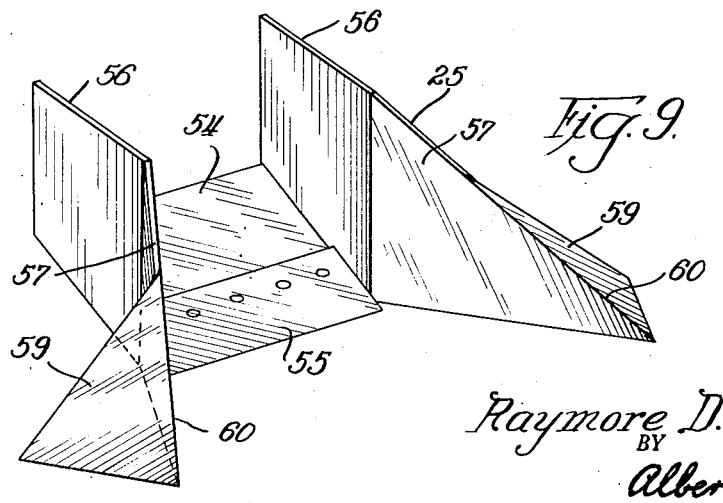

Patented Aug. 14, 1951

2,564,486

UNITED STATES PATENT OFFICE 2,564,486

LOADING MACHINE

Raymore D. MacDonald, La Grange, Ill., assignor to Athey Products Corporation, Chicago, Ill., a corporation of Illinois Application March 12, 1948, Serial No. 14,511

8 Claims. (Cl. 198—10)

This invention relates to loading machines, and more particularly to such machines of a self-propelled and movable type embodying a conveyor for effecting the movement of material in loading operations and the like.

One of the objects of my invention is to provide a machine adapted to use in loading material from stock piles and the like, which machine has mobility for approaching the material accompanied by an effective and efficient assembly of parts for feeding the material with substantial continuity onto a driven loading conveyor.

In the assembly of parts referred to, the preferred embodiment of my loading machine includes a pan, at the front end of which is a cutter blade, and across which cutter blade and pan material is moved by a driven feeder chain assembly constructed and arranged with the purpose and object of keeping the cutter blade and pan clean and cleared for effective operation by the use of buckets in the feeder chain assembly which substantially wipe the cutter blade and move along the pan in practically parallel relationship thereto, as well as effectively moving material toward, onto and across the pan.

From the forward end of the aforementioned pan and cutter blade, the feeder chain assembly extends forwardly and upwardly, so as to accomplish the desired purpose of moving material downwardly and toward the cutter blade.

It is further within the purview of my invention to provide a loading machine embodying a material feeding assembly which includes mold boards of a double-plate construction and each presenting a relatively sharp cutting edge and disposed to effect a high percentage of free fall of the material to the side portions of an intermediately located driven feeder mechanism.

As another feature contributing to improved operation, particularly in loading material from stock piles and the like, my loading machine includes one or more agitator blades each supported for disposition at an adjusted position above and in front of a driven feeder mechanism.

Other objects and advantages of the invention will be apparent from the following description and the accompanying drawings in which similar characters of reference indicate similar parts throughout the several views.

Referring to the five sheets of drawings,

Figs. 1 and 2 are respectively side elevational and top plan views of a mobile loading machine embodying a preferred form of my invention;

Fig. 3 is a fragmentary side elevational view drawn to a larger scale than Figs. 1 and 2 and showing the front portion of the loading machine depicted in Fig. 1, which front portion includes a material feeding mechanism;

Fig. 4 is a fragmentary side sectional view of a portion of the structure shown in Fig. 3 and wherein the operation of the loader in the handling of material from a stock pile or the like is illustrated;

Fig. 5 is a fragmentary side view somewhat similar to Fig. 4, drawn to a smaller scale and having different parts omitted to show the supporting frame structure for that portion of the assembly;

Fig. 6 is a fragmentary top plan view of the portion of the structure illustrated in Fig. 3, and having parts omitted, more clearly to depict the supporting structure for the assembly;

Figs. 7 and 8 are respectively top plan and front elevational views of a preferred form of mold board and feed pan assembly utilized in the loading machines depicted in Figs. 1, 2 and 3; and Fig. 9 is a perspective view taken from in front and to one side of the mold board and feed pan assembly shown in Figs. 5 and 6.

Having reference to the drawings, and particularly to Figs. 1 and 2 thereof, the exemplary embodiment of my loading machine which is depicted herein for illustrative purposes is a mobile unit having a main chassis 10 through which the structure of the loader is carried by steerable front wheels 12 and driven rear wheels 13. An internal combustion engine which is indicated at 14 in Fig. 1 serves as a prime mover for the loading machine. In the disclosed machine, a platform 15 is provided at one side of the main chassis 10 upon which an operator stands to control the course and operation of the machine, as well as to observe the performance.

Above the chassis 10 and sloping upwardly from front to rear, a conveyor 16 is supported. This conveyor, in the present instance, and as shown in Figs. 2 and 4, includes an endless conveyor belt 17 carried by rollers such as 18 and 19 and having side panels 20 and 22 extending along the opposite sides thereof to confine material to the surface of the belt. By preference, the conveyor 16 comprises a unitary sub-assembly of the machine and is supported from the main chassis 10 at or near its rear end for limited swinging movement relative to a horizontal axis. At the front end, the conveyor is supported for limited vertical movement by a frame 23 secured to the main chassis 10 and chains 24 (Figs. 1 and 3), as will be more fully described.

At the front end of the conveyor 16, a feed pan and mold board assembly 25, a driven feeding mechanism 26 and agitators 27 adapted to use particularly in stock pile loading are supported for separate adjustment to various vertical positions from the frame 23 and constitute a material feeding assembly adapted to the efficient and effective movement of material from a road surface, stock pile, or the like to the conveyor for elevation thereby and loading into a vehicle.

In the operation of the loading machine, the operator has control of the movements of the machine through control elements such as a steering wheel 28 and gear shift lever 29. In addition to being utilized for movements of the entire machine, the engine 14 is drivingly connected to shafts 30 and 32 through a drive shaft 33 and gear box 34. The conveyor belt is driven from the shaft 30 through an auxiliary gear box 35, while the feeding mechanism 26 is driven through the shaft 32 and an auxiliary gear box 36.

Referring more particularly to the larger and more detailed views of Figs. 3 and 4, the frame 23 preferably extends upwardly from the front end of the main chassis 10 and is braced on each side by trusses 37 extending downwardly and to the rear and having their opposite ends secured to the frame 23 and to the main chassis. Arms 38 project forwardly from opposite sides of the top of the frame 23 and are braced by angularly disposed trusses 39, the opposite ends of which are secured to the projecting ends of the arms and to the sides of the frame. Shafts 40, 42 and 43 extend laterally of the machine in substantially parallel and spaced relationship and are carried for rotational movement by the forwardly projecting arms 38. The shaft 40 has crank arms 44 secured to opposite ends thereof and an additional crank arm 45 secured to the mid-portion thereof in angularly disposed relationship to the crank arms 44. A power actuating element such as a hydraulic jack 46 has one end anchored to one of the trusses 37 and its other end pivotally connected to the crank arm 45, so that extension and retraction of the hydraulic jack produce rotational movement of the shaft 40 and swinging movements of the crank arms 44.

On opposite sides of the lower end, as shown in Fig. 3, the unitary conveyor assembly is carried from the main chassis through downwardly projecting end portions such as 47 of the side members of the frame 23 by truss bars 48; one end of each truss bar 48 being pivotally supported from the frame 23 by a stud shaft 49 and the other ends being connected to the conveyor assembly through a projecting shaft 50, so that the lower end of the conveyor assembly is vertically movable within a limited range about the axis of the studs 49 to establish desirable ground clearance. The chains 24, on opposite sides of the conveyor, each have a lower end secured to the conveyor assembly through a pin 52 located near the shaft 50. The other ends of the chains 24 are connected to the projecting ends of the crank arms 44, so that the lower end of the conveyor is supported at an adjusted height through the chains 24 and movements of the crank arms 44 effected by the hydraulic jack 46 serve to adjust the elevation thereof.

The feed pan and mold board assembly 25 is partially supported relative to the front end of the conveyor 16 by a yoke structure including opposed and similar side tubes 53 extending forwardly from and carried for vertical swinging movement by the opposite ends of the projecting shaft 50. My preferred type of feed pan and mold board assembly comprises a feed pan 54 in the form of a substantially flat plate which slopes upwardly from a normal position at or near ground level and overlaps the front end of the conveyor belt, as shown in Fig. 4. At the forward edge, the feed pan is preferably provided with a hardened cutter blade 55 which is secured thereto and projects beyond the forward edge of the pan. Also, at its opposite sides, the pan has side panels 56 secured thereto for confining material which is moved across the pan. Mold boards 57 are secured to or integral with the forward ends of the side panels 56 in diverging relationship forwardly of the pan so as to tend to concentrate the material therebetween as such material approaches the pan. To provide bracing, as well as support, it is the mold boards 57 to which the forward ends of the side tubes 53 are secured. Additional bracing and support are also provided by side braces 58 having their ends secured to the side tubes and to the upper and forward portions of the side panels 56. At the forward edges of the mold boards 57, side plates 59 are secured thereto by means such as welding, and so as to present relatively sharp forward edges 60. From those forward edges, the side plates 59 desirably diverge rearwardly from the outer surfaces of the mold boards, so as to tend to spread the material to form a path as the loading machine moves forwardly. As shown in Figs. 7, 8 and 9, it is my structural preference that the mold boards 57 are substantially right triangular in shape and adjoin the forward edges of the side panels 56 so that the lower edges of the mold boards extend forwardly from the cutting edge of the cutter blade 55. One of the right angular edges of each mold board adjoins one of the side panels while the other forms the bottom of the mold board. Thus, the third edge of each mold board extends upwardly from a position which is normally at or near ground level to the top edge of each side panel. With the parts shaped and assembled in this manner, the mold boards are practically vertical, so that they do not tend to lift material as they are moved into a pile, but rather the material has a tendency to fall freely therefrom toward and into the path of the feeding mechanism 26.

The side plates 59 which diverge rearwardly from the outer sides of the mold boards 57 are also preferably triangular, with their angles and sizes selected so that their lower edges are substantially in a plane with the lower edges of the mold boards and the cutting edge of the cutter blade. In the disclosed structure, the side plates terminate below the upper ends of the mold boards, but are of a sufficient extent to effect a substantial spreading action against the material as the mold boards move into a pile or the like, so that a path is provided for the inward movement of the machine.

In addition to the support for the feed pan and mold board assembly provided by the side tubes 53, and as shown in Figs. 1, 3 and 6, additional and adjustable support is provided through truss bars 62 on opposite sides of the feed pan and mold board assembly. Each of the truss bars, by preference, is substantially rigid in structure compressionally, as well as in tension, and includes a turnbuckle 63 for effecting adjustment of the length thereof. The lower end of each truss bar is movably connected to a bracket 64 secured to the forward end portion of one of the side tubes 53, while the other ends are connected to crank arms 65 on the shaft 42.

As depicted in Figs. 3 and 6, additional crank arms 66 and 67 are secured to the shaft 42 in substantially opposed relationship to one another and angularly displaced with respect to the crank arm 65. Also, the crank arms 66 and 67 are displaced from one another longitudinally of the shaft 42. One end of a hydraulic jack 68 has an end movably anchored to a bracket 69 secured to the truss 37, while its other end is connected to the crank arm 66. Another hydraulic jack 70 has an end anchored to a bracket 72 secured to the frame 23, and its other end connected to the crank arm 67. When hydraulic pressure is applied to one of the hydraulic jacks 68 or 70, while such pressure is relieved in the other, the one having the pressure applied thereto extends to effect movement of its connected crank arm 66 or 67 and consequent rotational movement of the shaft 42. By such rotational movement, the shaft 42 swings the crank arms 65 to raise or lower the forward end portion of the feed pan and mold board assembly which is connected thereto through the truss bars 62. Since the truss bars 62 are substantially rigid in compression as well as in tension, the level of the forward end portion of the feed pan and mold board assembly can be definitely determined and maintained by the adjustment effected through the set positions of the hydraulic jacks 68 and 70.

It is further to be noted that in addition to the mere adjustment of the level of the front end portion of the feed pan and mold board assembly, the angular disposition of that assembly may be adjusted by control of the position of the shaft 50 relative to the adjusted height of the front end of the pan and mold board assembly; the height of the shaft 50 being controlled, as explained, by the action of the hydraulic jack 46 through crank arms 45 and 44, shaft 40 and the chain 24.

Referring particularly to Figs. 3, 5 and 6, main support arms 73 for feeding mechanism 26 are supported for vertical swinging movement at their rear ends and extend forwardly from a shaft 74 carried by the trusses 37. At their forward ends, the main support arms 73 are resiliently and adjustably supported through flexible elements, such as chains 75, and tension springs 76; the chain and spring for each arm having ends connected together, and the other end of each spring being connected to the end of one of the main support arms while the other end of each chain is connected to a crank arm 77 secured to the shaft 43. A crank arm 78 displaced longitudinally of the shaft 43 from the crank arms 77 and also displaced angularly with respect to the crank arms 77 is secured to the shaft 43 and connected to a hydraulic jack 79. The other end of the hydraulic jack 79 is movably anchored to the frame 23, so that extension and retraction thereof varies the angular positions of the arms 77 to raise and lower the forward ends of the main support arms 73.

Auxiliary support arms 80 are secured to the extending ends of the main support arms 73, as depicted in Fig. 5, by curved trusses 82 and 83, the opposite end portions of which are secured, as by welding, to those main and auxiliary support arms. In the disclosed embodiment of my invention, the auxiliary support arms 80 are disposed between and extend angularly away from the main support arms 73. At the extending ends of the auxiliary support arms 80, auxiliary support arm extensions 84 are secured thereto and extend forwardly therefrom.

As depicted in Figs. 4 and 5, a drive shaft 85 which is driven from the gear box 36 extends through the end portions of the auxiliary support arms 80 near the main support arms 73 and is rotatably supported thereby. Sprockets 86 are mounted on and drivingly connected to the drive shaft 85 in positions spaced longitudinally of that shaft and somewhat inside the planes of the side panels 56 of the feed pan and mold board assembly. At their extending ends, the auxiliary support arms 80 rotatably carry an idler shaft 87, which shaft has sprockets 88 mounted thereon in alignment with the sprockets 86 longitudinally of the support arms. The axes of the shafts 85 and 87 are in fixedly spaced relationship. Another idler shaft 89 is carried by bearing plugs 90 at the extending end of the auxiliary support arm extensions. This shaft carries sprockets 92 in coplanar alignment with the sprockets 86 and 88. Although the bearing plugs 90 which carry the shaft 89 are normally secured at a fixed position by U-bolts 93, they are preferably adjustable longitudinally of the auxiliary support arm extensions; such adjustment being accomplished in the present instance by adjustment screws 94 threaded into projecting lugs 95 on the auxiliary support arm extensions and having their ends abutting the respective bearing plugs to effect the determination of their position when the U-bolts are loosened.

The sprockets 86, 88 and 92 at each side of the feeding mechanism carry a chain 96. By preference, the sizes and relative dispositions of the sprockets 86, 88 and 92 are such that the portion of each chain between the sprockets 86 and 88 is normally substantially parallel to the slope of the feed pan 54. At the front of the feeding mechanism, the portion of each chain between the sprockets 92 and 87 preferably slopes downwardly toward the cutter blade 55. The chains 96 carry buckets 97 which are preferably concavely curved on their forward surfaces and which project outwardly from and extend across the space between the chains. The normal direction of driven movement of the chains is such that the buckets move forwardly along the top of the feeding mechanism and downwardly at the front thereof. With the arrangement and disposition of parts described, and as depicted in Fig. 4, the normal adjusted height of the feeding mechanism 26 is such that the buckets practically wipe the upper surface of the cutter bar and move upwardly along the surface of the feed pan in closely spaced relationship, and then move upwardly away from the conveyor belt after the material has been deposited thereon. The movement of the buckets at the front of the feeding mechanism being downward, they tend to assist the normal gravitational flow of material such as 98 from the surface of a stock pile or the like to the concentrating space between the mold boards 57. Also, as the feeding mechanism is moved into a pile of material, the side blades 59 have a tendency to spread the material at the sides so as to provide a path for the forward movement of the machine.

Agitator poles 99 preferably comprise front and rear sections 100 and 102 engaged telescopically and held at an adjusted combined length by fastening means such as pins 103 extending through longitudinally displaced holes in the sections. At the rear end, each pole is hingedly connected to one of the main support arms 73 for vertical swinging movement by brackets 104 secured to those support arms. In the disclosed structure, the vertical positions of the agitator poles are determined by supports at the mid-portions of the poles. As disclosed in Figs. 3, 4 and 5, the support for each agitator pole comprises a support arm 105 secured to and extending upwardly from one of the main support arms 73; the adjacent agitator pole being secured thereto at an adjusted height by means such as a pin or bolt 106 extending through one of a series of holes 107 displaced along the support arm 105.

At their forward ends, the agitator poles 100 have agitator blades 108 secured thereto. The agitators, including the agitator poles 99 and blades 108, have been found to be particularly effective for assisting the flow of material to the feeding mechanism in loading certain types of material such as loose sand, gravel or rock and the like from stock piles. In the usual adjustment of the agitators, the agitator blades 108 are disposed to dig into the pile at a position somewhat above and ahead of the feeding mechanism. Since the normal operation of the driven feeding mechanism normally produces some vertical jiggling movement of that mechanism which is transmitted to the agitator blades through the main support arms and agitator poles, the agitators loosen and effect a downward gravitational flow of the material.

As illustrated in Figs. 3 and 4, it is my preference that the agitator blades 108 have pointed forward ends 109 which are adapted to dig into the pile. Also, the agitator blades are, by preference, disposed in substantially vertical planes so as to pass quite readily through the material when jiggled in the vertical direction, and are desirably disposed in angular relationship to the axes of the poles so as to point inwardly at the front, somewhat toward one another, at an obtuse angle to their respective pole axes. Such inward divergence of the agitator blades does not materially interfere with the vertical jiggling movement thereof, but tends to effect the agitation and flow of more material toward the feeding mechanism.

From the foregoing description of the structure and operation of my loading machine, it may be readily understood that I have provided such a machine which is adapted to a wide variety of uses, as a result of its mobility and the provision of an efficient feeding mechanism accompanied by an effective mold board and feed pan structure. It is further to be noted that in addition to the fact that the mold board and feed pan assembly, driven feeding mechanism and agitators are constructed and arranged for cooperative action, they are also relatively and separately adjusted to adapt their actions to materials and conditions of operation.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a mobile loading machine adapted to the loading of material from stock piles and the like and including a belt conveyor, the combination comprising a pan sloping upwardly at and having a portion overlying the forward end of the belt conveyor, said pan having a cutter blade extending across the forward edge thereof, mold boards diverging outwardly and extending forwardly from the forward end of the cutter blade, each of said mold boards comprising a substantially right triangular plate disposed with the right angular corner adjacent one end of the cutter blade and its rear edge substantially vertical, and a second triangular plate adjoining the forward edge of the first mentioned plate and defining therewith a relatively sharp edge sloping upwardly and rearwardly from the front end of the mold board, the plane of the second plate being disposed to diverge rearwardly from the plane of the first mentioned plate, and the lower edges of the first and second mentioned plates lying in a plane substantially parallel to the forward edge of the cutter blade.

2. In a mobile loading machine adapted to the loading of material from stock piles and the like and including a belt conveyor, the combination comprising a pan sloping upwardly at and having a portion overlying the forward end of the belt conveyor, said pan having a cutter blade extending across the forward edge thereof, mold boards diverging outwardly and extending forwardly from the forward end of the pan, and said mold boards each comprising two triangular plates adjoined to present a relatively sharp forward edge and diverging downwardly and rearwardly from one another, said sharp forward edges of the mold boards diverging forwardly, and the lower edges of the triangular plates lying in a plane substantially parallel to the forward edge of the cutter blade.

3. In a mobile loading machine adapted to the loading of material from stock piles and the like and including a belt conveyor, the combination comprising a pan sloping upwardly at and having a portion overlying the forward end of the belt conveyor, said pan having a cutter blade extending across the forward edge thereof, mold boards diverging outwardly and extending forwardly from the forward end of the pan, each of said mold boards comprising two triangular plates diverging rearwardly and downwardly from one another and adjoined to present a relatively sharp forward edge sloping downwardly toward the front to a position at substantially the level of the cutter blade, and a feeder mechanism disposed between and extending forwardly of the mold boards and including two chains carrying buckets therebetween and each carried by three sprockets, the disposition of the sprockets and direction of movement of the chain being such that the buckets move material downwardly and between the mold boards in a direction transverse to said relatively sharp forward edges of the mold boards and pass closely across the cutter blade and pan.

4. In a mobile loading machine adapted to the loading of material from stock piles and the like and including a belt conveyor, the combination comprising a pan sloping upwardly at and having a portion overlying the forward end of the belt conveyor, said pan having a cutter blade extending across the forward edge thereof, mold boards diverging outwardly and extending forwardly from the forward end of the pan, each of said mold boards comprising two triangular plates adjoined to present a relatively sharp forward edge and diverging rearwardly and downwardly from one another, and a feeder mechanism disposed between and extending forwardly of the mold boards and including two chains carrying buckets therebetween and each carried by three sprockets, one of the sprockets carrying each chain being disposed near the cutter blade and the others of the sprockets for each chain being respectively located to the fore and rear as well as above the said one and at positions such that a portion of the chain moves in a path substantially parallel to the pan and another portion thereof extends upwardly in front of the pan in obtuse angular relationship to the upper surface of the pan and in a direction transverse to said sharp forward edges of the mold boards.

5. In a mobile loading machine including a driven conveyor, the combination of a pan and mold board assembly comprising a pan sloping downwardly in a forward direction from the conveyor, side panels extending upwardly from the opposite sides of the pan and being substantially coextensive therewith longitudinally of the pan, mold boards adjoining and diverging forwardly from said side panels, and each of said mold boards including two plates of triangular shape adjoined at their forward edges so as to diverge rearwardly and downwardly from one another, the lower edges of said plates lying in a plane substantially parallel to the forward edge of the pan.

6. In a mobile loading machine as defined in claim 5, said plates which comprise the mold boards being shaped and adjoined to present a relatively sharp forward cutting edge sloping upwardly from their forward ends and toward the panels.

7. In a mobile loading machine as defined in claim 5, the combination wherein said mold board assembly is supported for vertical movement relative to the conveyor by side bars secured to opposite sides of said assembly and having ends carried for swinging movement relative to an axis at the end of the conveyor.

8. In a mobile loading machine including a driven conveyor the combination of a pan and mold board assembly comprising a pan sloping downwardly in a forward direction from the conveyor, side panels extending upwardly from the opposite sides of the pan and being substantially coextensive therewith longitudinally of the pan, mold boards adjoining and diverging forwardly from said side panels, each of said mold boards including two plates adjoined at their forward edges and diverging downwardly and rearwardly from one another, said mold board assembly being supported for vertical movement relative to the conveyor by members having an axis of swinging movement to the rear of and below the pan at the end of the conveyor, power operated means movable vertically to selected positions, and substantially rigid side support members connecting said power operated means to the mold board assembly at a position forwardly of said axis.

RAYMORE D. MacDONALD.

REFERENCES CITED

The following references are of record in the file of this patent:

UNITED STATES PATENTS

| Number | Name | Date |
|---|---|---|
| D. 118,612 | Baechli | Jan. 23, 1940 |
| 940,997 | Whaley | Nov. 23, 1909 |
| 1,200,092 | Elliott | Oct. 3, 1916 |
| 1,421,225 | Haupt | June 27, 1922 |
| 1,489,753 | Fraley | Apr. 8, 1924 |
| 1,768,657 | Baker | July 1, 1930 |

FOREIGN PATENTS

| Number | Country | Date |
|---|---|---|
| 426,339 | Germany | Mar. 9, 1926 |